(12) United States Patent
Sherga

(10) Patent No.: US 10,358,554 B2
(45) Date of Patent: Jul. 23, 2019

(54) THERMOFORMED STRUCTURAL COMPOSITES

(71) Applicant: Ecostrate SFS, Arlington, TX (US)

(72) Inventor: Ronald Matthew Sherga, Arlington, TX (US)

(73) Assignee: ECOSTRATE SFS, INC., Arlington, TX (US)

( * ) Notice: Subject to any disclaimer, the term of this patent is extended or adjusted under 35 U.S.C. 154(b) by 687 days.

(21) Appl. No.: 14/880,764

(22) Filed: Oct. 12, 2015

(65) Prior Publication Data

US 2016/0032098 A1 Feb. 4, 2016

Related U.S. Application Data

(62) Division of application No. 13/839,018, filed on Mar. 15, 2013, now abandoned.

(51) Int. Cl.
*C08L 77/00* (2006.01)
*B29C 51/02* (2006.01)
(Continued)

(52) U.S. Cl.
CPC .......... *C08L 77/00* (2013.01); *B29B 17/0042* (2013.01); *B29C 51/002* (2013.01); *B29C 51/02* (2013.01); *C08L 25/06* (2013.01); *C08L 33/20* (2013.01); *C08L 55/02* (2013.01); *C08L 67/03* (2013.01); *C08L 101/00* (2013.01);
(Continued)

(58) Field of Classification Search
CPC .... Y02W 30/62; C08L 2207/20; C08L 25/06; C08L 55/02; C08L 2205/03; C08L 33/20; C08J 5/046; B29C 70/465; B29C 51/002; B29C 51/02; B29C 51/082; B29C 45/0003; B29C 45/16; B32B 5/26; B32B 5/046; B32B 5/024; B32B 27/12; B32B 27/32; B32B 21/08; B32B 15/085; B32B 2311/00; B32B 2260/046; B32B 2260/021; B32B 38/08; B32B 2323/04; B32B 2323/10; B32B 2470/00; B32B 2590/00; B32B 2410/00; B32B 2419/06; B32B 2607/00; B32B 2479/00; B29B 17/0042; B29K 2101/12; B29K 2101/16; B29K 2105/26; B29K 2009/16; G09F 7/00; E01F 15/00;
(Continued)

(56) References Cited

U.S. PATENT DOCUMENTS 4,448,737 A * 5/1984 Johnson .............. B29B 17/0005
264/140
4,795,666 A 1/1989 Okada et al.
(Continued)

FOREIGN PATENT DOCUMENTS

WO WO2004-048072 * 6/2004

*Primary Examiner* — Camie S Thompson
(74) *Attorney, Agent, or Firm* — Husch Blackwell LLP; Nathan Sportel

(57) ABSTRACT

The present invention is generally directed to methods and systems for making thermoformed structural elements and composites, including the use of composites, dissimilar or variable processing materials. End products can have the same outward appearance as those products made by more demanding, more expensive extrusion process or injection process, but the end products can be pre-engineered to have significantly, unexpectedly, improved physical and chemical properties.

9 Claims, 10 Drawing Sheets

(51) Int. Cl.
*C08L 67/03* (2006.01)
*C08L 55/02* (2006.01)
*C08L 25/06* (2006.01)
*C08L 33/20* (2006.01)
*B29B 17/00* (2006.01)
*B29C 51/00* (2006.01)
*C08L 101/00* (2006.01)
*B29K 105/26* (2006.01)
*B29C 51/08* (2006.01)
*B29K 101/12* (2006.01)
*B29K 105/16* (2006.01)

(52) U.S. Cl.
CPC ........ *B29C 51/082* (2013.01); *B29K 2101/12* (2013.01); *B29K 2105/16* (2013.01); *B29K 2105/26* (2013.01); *C08L 2205/03* (2013.01); *C08L 2207/20* (2013.01); *Y02W 30/62* (2015.05)

(58) Field of Classification Search
CPC ......... Y10T 428/24736; Y10S 362/182; Y10S 40/00

USPC ......... 264/355, 322, 250; 428/187; 362/812; 40/541

See application file for complete search history.

(56) References Cited

U.S. PATENT DOCUMENTS

| | | |
|---|---|---|
| 5,212,223 A | 5/1993 | Mack et al. |
| 5,219,498 A | 6/1993 | Keller et al. |
| 5,286,576 A | 2/1994 | Srail et al. |
| 5,728,330 A | 3/1998 | Erwin et al. |
| 5,972,475 A | 10/1999 | Beekman |
| 6,226,944 B1 | 5/2001 | Peshkam et al. |
| 6,233,892 B1 | 5/2001 | Tylman |
| 6,432,349 B1 | 8/2002 | Pletcher et al. |
| 6,497,956 B1 | 12/2002 | Phillips et al. |
| 8,172,564 B2 | 5/2012 | Pricone |
| 8,475,894 B2 | 7/2013 | Noble et al. |
| 8,518,312 B2 | 8/2013 | Katz |
| 2004/0166243 A1 | 8/2004 | Inglefield |
| 2004/0224590 A1 | 11/2004 | Rawa et al. |
| 2007/0045886 A1 | 3/2007 | Johnson, Sr. |
| 2007/0270529 A1 | 11/2007 | Lutzmann et al. |
| 2009/0151576 A1 | 6/2009 | Ito et al. |
| 2012/0052760 A1 | 3/2012 | Doyle et al. |

\* cited by examiner

THERMOFORMED STRUCTURAL COMPOSITES

RELATED U.S. APPLICATION DATA

This application is a divisional of patent application Ser. No. 13/839,018, filed on Mar. 15, 2013, entitled "Thermoformed Structural Composites", the entire disclosure of which is incorporated herein by reference.

TECHNICAL FIELD OF THE INVENTION

The present invention is generally directed to methods and systems for making thermoformed structural elements and composites, including the use of composites, dissimilar or variable processing materials.

BACKGROUND OF THE INVENTION

There is a major unresolved challenge in recycling mixed plastics and mixed plastics with non-plastic-contaminates. The difficulty with this type of recycling process is that the different plastics used in the recycling process are not compatible with each other. There is an inherent inability of two or more plastics to undergo mixing or blending, which means that some plastics cannot be mixed together during the recycling process. Also, different types of plastics are immiscible at the molecular level, and there are significant differences in processing requirements at the macroscopic level with respect to the different plastic inputs.

Even a small amount of the wrong type of plastic can ruin an entire container or bale of recycled material. Co-mingled material is worth significantly less than sorted material. Mixed or co-mingled plastics are frequently contaminated with such items as metals, paper, pigments, inks, adhesives, carbon fiber, flame retardants, fiber reinforced plastics, glass filled plastics, cured silicon and rubber.

A primary reason for these differences is the different melting points associated with different plastic resins, or the inability of certain plastics to undergo a "re-melting" process. Plastics involved in recycling activities can be considered in two broad categories: thermoplastics and thermoset. Comparing these types, in the present art, thermoplastics are much easier to adapt to recycling.

Thermoplastic polymers can be heated and formed, then heated and formed again and again. The shape of the polymer molecules are generally linear or slightly branched. This means that the molecules can flow under pressure when heated above their melting point. Thermoset polymer plastics, on the other hand, undergo a chemical change when they are heated, creating a three-dimensional network. Thermosets cannot be re-melted or remolded and therefore have been traditionally difficult to recycle. Typical types of thermosetting plastics are Polyurethane (PU), epoxies, polyesters, silicones and phenolics, with vulcanized rubber being an excellent example of a thermosetting and also polyoxybenzylmethylenglycolanhydride (bakelite).

Materials made from two polymers mixed together are called blends. In general, polymers cannot be homogeneously mixed with one another, and even attempting to mix most polymers will result in phase-separated mixtures.

An example of phase-separated mixtures or immiscible blends is polystyrene and polybutadiene, which are immiscible polymers. When you mix polystyrene with a small amount of polybutadiene, the two polymers will not blend together. Polystyrene is generally a stiff, brittle, material that will break or shatter if bent. Polybutadiene separates from the polystyrene into usually small, isolated, sphere-shaped item, and the polybutadiene spheres in the blend are elastic in nature and absorb energy under stress.

The polystyrene and polybutadiene immiscible blend bends and does not break like polystyrene by itself. The immiscible blends of polystyrene and polybutadiene are known as high-impact polystyrene, or HIPS.

Another example of an immiscible blend is one made from Polyethylene Terephthalate (PET) and poly(vinyl alcohol) (PVA). The blend results in PET and PVA separating into individual sheetlike layers. This blend is particularly useful in the making of plastic bottles for carbonated liquids.

"Recycling and Recovery of Plastics," by Joop Lemmens recognizes a recent trend in the increased use of polymer mixtures, blended polymers and novel plastic combinations. An example of 'novel' plastic is cross-linked polyethylene (PEX). Crosslinking polyethylene changes the polymer from a thermoplastic to a thermoelastic polymer. Once it is fully crosslinked, polyethylene tends not to melt but merely to become more flexible at higher temperatures.

Examples of problems in recycling plastics include cases where a quantity of recycled PET is contaminated with a small amount of PVC. The PVC will release hydrochloric-acid gas before the process temperature to melt the PET is reached, and the released gas will degrade the PET. In the reverse, where a small amount of PET contaminates recycled PVC, the PET will remain in solid form after the PVC reaches its melting point, which results in crystalline PET inhabiting the post-melt-cooled PVC structure.

A major problem in the recycling of PVC is its high chlorine content of raw PVC, and the hazardous additives added to the polymer to achieve the desired material quality. PVC requires separation from other plastics and sorting before mechanical recycling. PVC recycling is difficult because of high separation and collection costs, loss of material quality after recycling, and the low market price of recycled PVC compared to virgin PVC.

There are thousands of different varieties of plastic resins or mixtures of resins, and most plastics have a code number or classification. Plastics not identified by code numbers are difficult to recycle. These items, such as computer keyboards, do not fit into the numbering system that identifies plastics used in consumer containers.

Bazant & Cedolin address concerns about the stability of structural composites, such as the composites made from recycled materials. Namely, Bazant & Cedolin state: "[t}hree-dimensional instabilities are important for solids with a high degree of incremental anisotropy, which can be either natural, as is the case for many fiber composites and laminates, or stress-induced, as is the case for highly damaged states of materials" and "[t]he typical three-dimensional instabilities are the surface buckling and internal buckling, as well as bulging and strata folding."

Bazant & Cedolin state that " . . . three dimensional buckling modes described . . . no doubt play some role in the final phase of compression failures. For example, Bazant (1967) showed that a formula based on . . . thick-wall buckling . . . agrees with his measurements of the effects of the radius-to-wall thickness ratio on the compressive failure stress of fiber-glass laminate tubes. On the other hand, other physical mechanisms, particularly the propagation of fractures or damage bands, are no doubt more important for the theory of compression failure. The reason is two-fold: (1) The calculated critical states for the three-dimensional instabilities require some of the tangential moduli to be reduced to the same order of magnitude as some of the applied stress components, which can occur only in the final stage of the failure process; and (2) the body at this stage might no longer be adequately treated as a homogeneous continuum."

Bazant & Cedolin address "orthotropic composites that have a very high stiffness in one direction and a small shear stiffness may suffer three-dimensional instabilities such as internal buckling or surface buckling. These instabilities, which involve buckling of stiff fibers (glass, carbon, metal) restrained by a relatively soft matrix (polymer), are analogous to the buckling of perfect columns. When the fibers are initially curved, one may expect behavior analogous to the buckling of imperfect columns. In particular, the initial curvature of fibers causes fiber buckling, which reduces the stiffness of the composite. It also gives rise to transverse tensions, which may promote delamination failure."

Urquhart & O'Rourke address three dimensional instabilities as follows: "[w]henever a material is subjected to compression in one direction, there will be an expansion in the direction perpendicular to the compression axis. When this expansion is resisted, lateral compressive stresses are developed, which tend to neutralize the effect of the longitudinal compressive stress, and thus increase resistance against failure. This is the principle involved in the use of spiral or hooped reinforcement . . . ".

Also, Urquhart & O'Rourke state that "[w]ithin the limit of elasticity the hooped reinforcement is much less effective than longitudinal reinforcement. Such reinforcement, however, raises the ultimate strength of the column, because the hooping delays ultimate failure . . . ", and the material " . . . continues to compress and to expand laterally, thus increasing the tension in the bands, while final failure occurs upon the excessive stretching or breaking of the hooping." "As long as the bond between the . . . " fiber and the polymer " . . . is effective, the two materials will deform equally, and the intensities of the stresses will be proportional to their moduli of elasticity."

A structural system's failure mode can be defined as the characteristics bounded by that known as "catastrophic" or "localized" within the said system, wherein the term "catastrophic" indicates a system-wide structural failure involving progressive individual and sub-systemic structural element(s) failures and the term "localized" indicates a system or sub-system arrest of structural failure and/or redistribution of the force(s) which resulted in the initial failure-mode of the initial failed structural element.

One of the unexpected results of full-scale testing of the present invention's physical manifestations, is the damping effect of the present invention to structural "shock", such as the characteristic of nailing or directly impacting physical samples of the present invention.

U.S. Pat. No. 6,497,956 (956) issued Dec. 24, 2002, to Phillips et al., teaches that " . . . high density polyethylene (HDPE) . . . " and " . . . plastic lumber made from HDPE, PVC, PP, or virgin resins has been characterized as having insufficient stiffness to allow its use in structural load-bearing applications." "For example, it is noted that non-reinforced plastic lumber products typically have a flexural modulus of only one-tenth to one-fifth that of wood such as Douglas fir, . . . " U.S. Pat. No. 5,212,223 discusses the inclusion of short glass fibers within reprocessed polyolefin and further teaches doing so to increase the stiffness of the non-reinforced plastic lumber by a factor of 3:4. However, none of the prior art known to applicant is capable of fabricating plastic lumber having the structural stiffness and strength of products made according to the present invention . . . "

U.S. Pat. App. No. 20070045886, filed Mar. 1, 2007, by Johnson teaches that: " . . . composite lumber is currently used for decking, railing systems and playground equipment. Sources indicate that there currently exists a $300 million per year market for composite lumber in the United States. It is estimated that 80% of the current market uses a form of wood plastic composite (WPC). It is estimated that the other 30% is solid plastic. A wood plastic composite (WPC) refers to any composite that contains wood particles mixed with a thermaloset or thermoplastic . . . . The presence of wood fiber increases the internal strength and mechanical properties of the composite as compared to, e.g., wood flour." And, "[f]or example, the addition of wood fillers into plastic generally improves stiffness, reduces the coefficient of thermal expansion, reduces cost, helps to simulate the feel of real wood, produces a rough texture improving skid resistance, and allows WPC to be cut, shaped and fastened in a manner similar to wood."

Also, "[t]he addition of wood particles to plastic also results in some undesirable characteristics. For example, wood particles may rot and are susceptible to fungal attack, wood particles can absorb moisture, wood particles are on the surface of a WPC member can be destroyed by freeze and thaw cycling, wood particles are susceptible to absorbing environmental staining, e.g., from tree leaves, wood particles can create pockets if improperly distributed in a WPC material, which may result in a failure risk that cannot be detected by visual inspection, and wood particles create manufacturing difficulties in maintaining consistent colors because of the variety of wood species color absorption is not consistent. Plastics use UV stabilizers that fade over time. As a result, the wood particles on the surface tend to undergo environmental bleaching. Consequently, repairing a deck is difficult due to color variation after 6 months to a year of sun exposure."

"In a typical extrusion composite design, increased load bearing capacity capability may be increased while minimizing weight by incorporating internal support structures with internal foam cores. Examples of such designs are taught in U.S. Pat. Nos. 4,795,666; 5,728,330; 5,972,475; 6,226,944; and 6,233,892."

"Increased load bearing capacity, stability and strength of non-extruded composites has been accomplished by locating geometrically shaped core material in between structural layers. Examples of pre-formed geometrically shaped core materials include hexagon sheet material and lightweight woods and foam. Problems associated with typical pre-formed core materials include difficulties associated with incorporating the materials into the extrusion process due to the pre-formed shape of the materials."

"Other efforts to increase strength with composite fiber design have focused on fiber orientation in the composite to obtain increased strength to flex ratios. In a typical extrusion composite process, the fiber/fillers are randomly placed throughout the resin/plastic. Therefore increasing strength by fiber orientation is not applicable to an extrusion process."

"Foam core material has been used in composites for composite material stiffening, e.g., in the marine industry, since the late 1930's and 1940's and in the aerospace industry since the incorporation of fiber reinforced plastics."

"Recently, structural foam for core materials has greatly improved in strength and environmental stability. Structural core material strengths can be significantly improved by adding fibers. Polyurethane foams can be modified with chopped glass fibers to increase flexible yield strength from 8,900 psi-62,700 psi."

"Prior art patents tend to describe foam core materials as rigid or having a high-density. However structural mechanical properties of the foam core tend not to be addressed. A common method to obtain a change in load capacity is to change the density of the material. For example, this can be done in a polyurethane in which water is being used as a blowing agent. The density of a polyurethane decreases with the increase in water concentration."

"One problem that may occur when a core material and a structural material are not compatible both chemically and physically is delamination. Chemical and physical incompatibility can result in composite structures that suffer structural failures when the core material and the structural material separate from one another."

"[C]oefficient of thermal expansion (CTE)" is discussed in Johnson, as well as "[t]he conformable core material is injected into and around internal structural support members of an extruded member. Preferably, while the member is being extruded, the core material is injected to replace air voids within the member. The injection of conformable structural core material at the same time and same rate as the structural member is being extruded produces significant improvements by increasing load bearing capacity, stability and overall strength and by improving economic feasibility. For example, a rigid polyurethane foam is approximately 10 times less expensive per volume than PVC. Therefore, by replacing some interior volume of an extruded member with foam, the PVC volume is reduced while maintaining the same structural strength or greater. Therefore, the injection of a conformable foam results in a significant cost savings. In some applications, the injectable conformable structural core material may be applied to an extruded member that has been previously cured."

"One benefit of an injectable conformable structural core material is that the core material is not limited by the structural design of the composite member because the core material conforms to the geometric shapes present in structure."

"Although a core material and a structural material may be initially combined into a composite member without regard to the CTE's of each, this does not guarantee structural integrity over time. Therefore, the invention of the application involves tailoring of the conformable structural core material by the selection of optimal amounts of structural fillers to achieve a desired CTE of the materials. The step of tailoring the structural core material provides a solution for composite structural design regardless of the composition of the materials."

"One aspect of the invention is directed towards the mechanical interaction and the relationship between a selected thermal plastic and a selected foam core material. Thermal plastics have mechanical properties that are influenced by environmental temperatures. For example, thermal plastics are stronger at colder temperatures but are more brittle. Thermal plastics are weaker in warmer weather, but are more flexible."

"Foam for an internal core material inside a thermal plastic material may be tailored to overcome variations in structural strengths of thermal plastics. For example, an ideal core material is selected to possess thermal expansion properties that offset the thermal sag characteristics of thermal plastic structural material that the structural material experiences due to thermal heating in the environment. The thermal expansion of the core and mechanical stiffness of the composite may be tailored to achieve desired strength and internal pressure, resulting in mechanical stiffening of the composite."

"The interaction of thermal sag of the thermal plastic material in relationship to the thermal expansion of the internal core material may be considered to select an ideal foam for use with a particular plastic. Ideally, the materials will function as a true composite. Because of the enormous uses of this invention associated with composite design and their applications with the overwhelming selection of materials and their combinations, the method described herein allows for optimal material pairings to be determined. As internal cross members of a structural member and the exterior structure undergo mechanical weakening as the temperature increases, a selected internal core material having an optimal thermal expansion with enhanced thermal mechanical properties will improve the rigidity and the mechanical strength of the combined composite in a manner similar to inflating an automobile tire to increase mechanical rigidity of the rubber."

"A further advantage associated with the use of core materials such as foams are thermal insulation properties of the foam. A significant mechanical advantage is achieved by reducing the heat transfer rate from the surface of a structural member to an internal support structure of the composite, thereby thermally shielding the internal support structure from heat fluctuations and maintaining increased internal strengths of the cell structures in the composite during elevated temperatures."

"CTE can be tailored in a composite matrix to improve surface functionality between the structural material and the core, thereby reducing the shear stresses that are created by thermal cycling at the contact interface of the two materials. Polyurethane foam densities are directly proportional to the blowing agent, typically water. The less water, the tighter the cell structure, which results in higher density foams."

"In a closed cell structure, controlling internal forces caused by thermal cycling produced by the core material can be accomplished by tailoring the CTE. The CTE of a core material may be tailored by adjusting an amount of filler in the core material. For example, fillers such as chop fibers and micro spheres will have much lower CTE in the structural foam. The CTE of glass spheres is approximately 100 times smaller than most resin materials."

"Glass spheres or ceramic spheres have enormous compression strength in comparison to the foam cells created by blowing agents. Therefore, the addition of micro spheres will not only provide the ability to tailor the CTE of the foam but it will replace low compression strength cell structures with higher strength cell structures."

"The incorporation of chop fibers adds dramatic cross structural strength throughout the foam. Applicant's mechanical model analysis clearly illustrates an increased strength of materials resulting from the presence of core material regardless of the mechanical structure. The analysis was directed to extruded PVC. Some of the extruded PVC members were filled with chopped fibers and some were not. The chopped fibers increased strength of the structural member and decreased the CTE. The additives of selected fillers to the foam core materials illustrate similar characteristics. Selecting appropriate materials for a composite is complicated because composites are not homogeneous materials. However, composites are required to function as a homogeneous structure without structural deviation. The models clearly show how reinforcing fibers increases load bearing capabilities in the composite materials."

"Manmade fibers and fillers can be used to improve mechanical properties as well as to lower CTE's of a core material. Ideally, filler materials should be environmentally stable and malleable into desired geometric configurations so that they may be incorporated into a structural design. Examples of fiber materials include fiberglass, carbon and nylon. These fibers can be cut to a specific length with a desired diameter that can be incorporated into an injection molding process either from the plastics manufacturer if the desired material is a foam plastic. If the resin is a reactive material such as polyurethane foam, the fillers and fibers can be combined either in the liquid stage prior to mixing the reactive components or in the foam mixing chamber prior to being extruded. The coefficient of thermal expansion is directly related to the volume fillers to plastics ratio."

"Solid core materials can be made from high-density polyurethane, polyureas and epoxy materials etc., having high strength and fast cure times. These materials may be filled with fillers or micro spheres to produce high strength injectable core materials."

SUMMARY OF THE INVENTION

The present invention is generally directed to methods and systems for making thermoformed structural elements and composites, including the use of composites, dissimilar or variable processing materials. A comparison of test data shows the present invention possesses unexpected improved properties that the present art does not have.

Materials used originate from polymer waste streams of various origins, primarily engineer grade plastics recovered from electronic-waste and industrial scrap such as from automotive production. Materials also will include fibrous polymer waste recovered from 100% post consumer sourcing or other waste streams where standard methods of recovery have been to landfill, or waste to energy. The innovative recovery and reuse of these waste streams is a key component of our inventiveness and technology.

The present invention avoids the expense and the technical issues of the present art on how difficult it is to 'clean' said 'dirty' recycled materials so that they are acceptable to the extrusion process and or the injection mold process.

The end products can have the same outward appearance as those products made by the more demanding, more expensive extrusion process and or injection process but the present invention's end products can be pre-engineered to have significantly, unexpectedly, improved physical and chemical properties.

An object of the present invention is a thermoformed structural-composite construct utilizing the differential between certain materials' melt-point(s), said different material(s) thermal-mass, thermal-energy-densities, thermal-energy gradient(s) and structural integrity/stability in said material(s) in the individual near-melt-point range vis-a-vis pressure-heat ratio, consisting primarily of recycled thermoplastics, thermoset plastics, and non-plastic materials and directly reduced from grind-states to a laminate film and or sheet and or plate-state which is reinforced via fibers, having an average length greater than the composite's thickness, which are tensioned during the manufacture of said composite.

Another object of the present invention is the elimination of costs and loss of time-value associated with separation of waste-stream plastics into thermoplastics, thermosets, and non-plastics and then the elimination and loss of time-value of conversion of such materials into film and or sheet and or plate before such materials enter a thermoforming process.

An object, in reference with the previous paragraphs, of the present invention is to eliminate the direct labor costs associated with 'grinding' plastic material, to such a condition, in preparation to pelletizing said plastic material, so as to feed said pelletized plastic material before extruding plastic material into sheet, thereby readying said plastic sheet material for shearing and or cutting such, before placement of cut plastic sheet material in a thermoform.

Another object, in reference with the previous paragraphs, of the present invention is to eliminate the direct labor costs associated with pelletizing said plastic material, so as to feed said pelletized plastic material before extruding plastic material into sheet, thereby readying said plastic sheet material for shearing and or cutting such, before placement of cut plastic sheet material in a thermoform.

Yet another object, in reference with the previous paragraphs, of the present invention is to eliminate the direct labor costs associated with extruding plastic material into sheet, thereby readying said plastic sheet material for shearing and or cutting such, before placement of cut plastic sheet material in a thermoform.

Still another object, in reference with the previous paragraphs, is the elimination of the capital equipment referenced above as the present art preparation for and conduction of thermoforming. Some examples are the manufacturing equipment directly involved in pelletizing equipment and or the extruding plastic material into sheet equipment. Also eliminated are handling, storage and indirect equipment, building(s) associated with such and the indirect labor costs directly related with maintenance of said same.

A further object of the present invention is to ease and encourage the use of post-consumer plastics in thermoform operations. By eliminating the need to pelletize and or sheet-extrude plastic material(s) before thermoforming, the significant costs, involved in 'separation' and or 'cleaning' post-consumer plastic material, are eliminated.

A still further object of the present invention is to utilize waste-stream plastics which the present art has difficulties in economically separating for recycling and using in finished products. An example is waste-stream plastics which are a mix of ABS plastic and PVC. ABS and PVC have very similar specific-gravities and melt-points. While the two have the aforementioned commonalities in the present art examples, difficulties arise when such mixes are extruded or injection molded. The present invention allows the use of such plastic mixes in the manufacture of finished products.

Yet another object of the present invention utilizes the formation, via the thermoforming operation of structurally bridging internal structural differences. In addition to the above, the present invention provides the use of 'foaming' material(s), included with the above referenced thermoformable plastic material(s), which when said 'foaming' materials is/are triggered, provides heat, or additional heat, and provides pressure or additional pressure to the thermoform process.

A further aspect of the present invention is providing a well distributed non-thermoform-able material(s) throughout a thermoformed item. Yet another aspect of the present invention is providing well distributed thermoform-able materials, of different melt-points, throughout a thermoformed item.

DETAILED DESCRIPTION OF THE PREFERRED EMBODIMENTS

Figure 1:
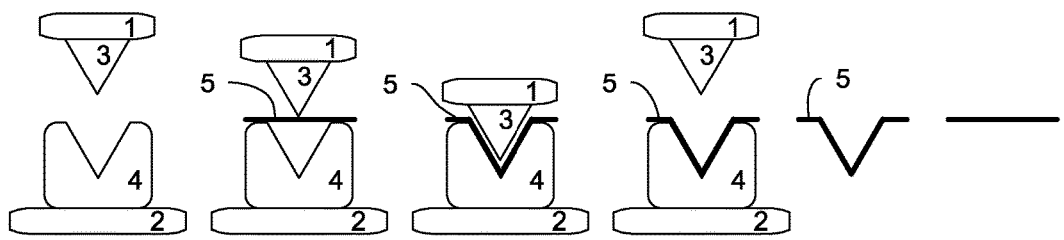
FIG. 1 illustrates the process of forming an embodiment of a thermoformed composite.

The invention utilizes the manufacturing process known as 'thermoforming'. The thermoform process combines thermally charging a material, usually a material such as plastic sheet, to a pliable or plastic-state, and pressing, frequently via a vacuum, into a desired shape. The thermoformed item is usually then allowed to cool resulting in a hardening of the thermoformed material. Thermoforming is frequently the lowest-cost-manufacturing process, over other processes, due in part to usually lower tooling costs and greater factory flexibility.

Thermoform methods and systems are usually subdivided, denoted, as "thin-gauge" and "thick-gauge". By industry standard, thin-gauge methods and systems usually mean a finished product that is 1.5 mm (0.059 in.) or less in thickness. Thick-gauge methods and systems usually mean a finished product which is 3 mm (0.12 in.) or greater in thickness.

The present invention is applicable regardless of the final thermoformed product's thickness. For clarity, the following will address the typically encountered 'thick-gauge' methods and systems, it being understood that the invention is not limited by the thickness of the end product.

The present invention utilizes the difference in melt temperatures of materials commonly encountered in thermoform operations. For example, the melt point for nylon, depending on specific configuration, is above 420 degrees F., while amorphous ABS has an effective melt point above 220 degrees F. Such differentials in melt point vis-a-vis the thermoform process allows for a blending of two or more materials which once through a thermoform can result in specific structural-composites.

The present invention utilizes the differences in energy per unit mass (specific energy or thermal-energy-density) of the materials during the construction of the present invention's structural-composites physical manifestations. For example, physically mixing two materials with different thermal-energy-densities results in an entity in which heat transfer occurs between the two materials when thermal energy is externally applied to said mixture.

The present invention utilizes the differences in the thermal-energy gradient (rate of temperature change with distance) of the materials during the construction of the present invention's structural-composites physical manifestations. For example, physically mixing two materials with different thermal-energy gradients results in an entity in which the heat transfer rate occurs between the two materials when thermal energy is externally applied to said mixture.

An example of a commercial application of two materials, with different melt points, which may be configured into a structural-composite is where nylon fiber and a plate of ABS plastic is thermoformed at a temperature above the melt point of the ABS plastic but below the melt point of the nylon. The standard thermoform combination of heat and pressure will cause the ABS plastic to flow into and surround the nylon-fiber(s).

The character of the physical interface between the nylon weave and the ABS plastic is deterministic via the character of the nylon-fiber and geometry before, during and after the thermoform process. The structural aspects of the referred to above nylon/ABS structural-composite is deterministic based on the significantly different mechanical properties of the chosen nylon-type, size-length-diameter of individual nylon fiber(s), fiber configuration(s) and chosen ABS plastic-type.

Substitution of the referred above ABS plastic 'plate' with ABS plastic pre-extrusion 'grind' and reconfiguration of the above referred flexible nylon-fiber(s) explicitly describes one of the intents of the present invention.

Use of a material, in a configuration, such as, but not limited to, ABS plastic pre-extrusion 'grind', allows the inclusion of, and mix with, the 'grind' material(s) which may or may not be normally thermoform-able. Examples of material(s) which might be 'included' and or 'mixed', before thermoforming, with a thermoform-able 'grind', are ceramic(s), metal(s), organic(s) and the like.

Use of a 'foaming' material 'mixed' with the above referred thermoform-able 'grind' allows the deterministic nature of a 'foaming' material to provide and or enhance the 'pressure' aspect of commonly encountered thermoform operations. Examples of, but not limited to, 'foaming' materials are polystyrene and or polyurethane. Such 'foaming' material(s) may be 'triggered' to 'foam' before, during, or after the thermoforming of the desired structural-composite. In the use of foaming materials, such as foaming polyurethane and polystyrene, the activation of the foaming action can be designed to occur before, during, and or after thermoforming the intended structural composite. Activation of the foaming action after the construction of the structural composite allows intended results such as internal pressurizing of said structural composite.

As a general statement, a thermoform-able 'grind' has a lower density than said 'grind' material post-thermoform. That is, the heat/pressure of the thermoform operation densities the 'grind'. The process of 'squeezing' or distorting via the thermoform operation, results in an increase in the surface-area-to-volume (S/V) ratio.

Thermoform-able materials may be categorized as 'virgin' (meaning materials which do not have a history) 'post-industrial' (meaning materials which were involved in a manufacturing process but were not consumed) and 'post-consumer' (meaning materials which were completely used in the manufacture of an item which was sold or consumed by another entity).

A specific to the present invention is the recycling of post-consumer items consisting of relatively high percentages of thermoform-able materials. Post-consumer recycle of solid waste has been costly in execution. Recycling post-consumer plastic solid waste has been particularly difficult to achieve. There are a number of reasons for this inability in the present art, it lacks economic methods to physically separate plastics of similar specific-gravities but with different physical and or chemical properties. Another reason is that post-consumer plastic solid waste is frequently embedded with non-plastic materials which are frequently uneconomic to be detectable.

The present invention relates to predetermined dimensional structural composites and similar load carrying structural elements. Such load carrying structural element design, advancing the present art, address the following engineering characteristics: (a) components that do not rust, corrode, or decompose when exposed to fresh water and/or sea water and/or sewage and/or water-borne creatures, plants, insects or other such, (b) components that do not require special handling equipment on the installation job-site, or factory floor, (c) Components that are easy to transport to installation job-site, or factory floor, (d) Components that allow for ease of handling and rigging, in installation and or assembly applications, with other structural element sections, (e) Components that do not require new expensive installation equipment, (f) Components that allow for quick field jointing or assembly with other structural element sections, (g) Structural element sections which are certified and in use by state agencies and approved for use by Federal and State Agencies, (h) Components that allow the use of existing engineering design codes, addresses pertinent engineering design consensus standards and specifications, and (i) Composites' elements that are geometrically similar in cross-section to that which they are intended to be structural substitutes.

The present invention's economic vitality centers on three aspects. First, full-scale testing of examples of the present invention's physical expressions show that said examples provide factors-of-magnitudes higher unit strengths than common grades of un-reinforced recycled plastic with similar stiffness or load to deflection ratios. As such, modest engineering design efforts will result in significant reductions in the present invention's materials-costs while providing the customer with equivalent product utility, Second, the present invention's physical manifestations, if engineered to common un-reinforced recycled plastic engineering characteristics, is of significantly lower mass (or weight) resulting in lower transportation costs. And, third, the present invention's significantly lower mass (or weight) results in easier assembly or installation labor costs either in a factory environment and or construction site.

Similar structural aspects are in play involving hardware fastener applications such as screws, bolts and nails except that shear is usually an initial structural failure mechanism, where said failure is in the recycled plastic and not the fastener, followed immediately with bending moment carried by the recycled plastic element located between the point of initial shear failure, usually located at or near the shank of the fastener some distance from the surface of the recycled plastic element. Such structural failure mode behavior provides some mitigation from catastrophic structural failure when a given fastener/lumber-element connection is loaded beyond its capacity.

The present invention's preferred embodiment is a thermoformed structural-composite construct utilizing the differential between certain materials' melt-point(s), said different material(s) thermal-mass, thermal-energy-densities, thermal-energy gradient(s) and structural integrity/stability in said material(s) in the individual near-melt-point range vis-a-vis pressure-heat ratio, consisting primarily of recycled thermoplastics, thermoset plastics, and non-plastic materials.

The present invention's physical manifestations may be addressed as thermoformed structural-composites constructed utilizing the differential between certain materials' melt-point(s), said different material(s) thermal-mass, thermal-energy-densities, thermal-energy gradient(s) and structural integrity/stability in said material(s) in the individual near-melt-point range vis-a-vis pressure-heat ratio, consisting primarily of recycled thermoplastics, thermoset plastics, and non-plastic materials and directly reduced from grind-states to a laminate film and or sheet and or plate-state.

An alternative preferred embodiment is as described above with said thermoformed structural-composites constructed utilizing the differential between certain materials' melt-point(s), said different material(s) thermal-mass, thermal-energy-densities, thermal-energy gradient(s) and structural integrity/stability in said material(s) in the individual near-melt-point range vis-a-vis pressure-heat ratio, consisting primarily of recycled thermoplastics, thermoset plastics, and non-plastic materials and directly reduced from grind-states to a laminate film and or sheet and or plate-state which is reinforced via fibers, having an average length greater than the composite's thickness, which are tensioned before or during the manufacture of said composite.

An alternative preferred embodiment utilizes the differential between certain materials' melt-point(s), said different material(s) thermal-mass, thermal-energy-density, thermal-energy gradient(s) and structural integrity/stability in said material(s) in the individual near-melt-point range vis-a-vis pressure-heat ratio. That is, if a first material A has a melt-point of X, and if a second material B has a melt-point of X+1, and a third material has a melt-point of X+2, for a given 'pressure', then, by thermal-energy-management alone, the resultant thermoformed product is deterministic.

If said materials A's, B's & C's thermal-gradient's nature are known, for a given 'pressure', then by thermal-energy-management alone, the length of time required to thermoform the resultant product is deterministic. Design of such a deterministic product may begin with material C placed in the thermoform press, followed by material B placed on top of material A, followed in turn with the placement of material A on top of material B. For a given 'pressure', with the addition of thermal-energy, A will reach its melt-point before B & C. If not constrained, material A will 'flow' past material B and co-mingle with material C. The addition of more thermal-energy will then cause material B to reach its melt-point and, if not constrained, will co-mingle with the mixture of A & C.

Specific to this alternative preferred embodiment and demonstrated viable by the inventor, if material C is recycled nylon-fiber thread, and material B is recycled post-consumer electronic-waste Acrylonitrile butadiene styrene (ABS) plastic and material A is white (translucent) High Impact Polystyrene (HIPS) then the resultant product is as referenced above. That is, a structural composite consisting of unmelted nylon-fiber thread encased in ABS plastic which in turn is encased in white (translucent) HIPS.

A further refinement specific to this alternative preferred embodiment, utilizes pre-heating the nylon-fiber providing a thermal-mass lower than the nylon-fiber's melt-point but higher than the ABS melt-point. This configuration allows the on-set of ABS melt while the ABS insulates the HIPS material. Addition of thermal-energy and pressure causes the ABS to flow and encase the nylon before the HIPS melt-point is reached.

Specific to that configuration referenced above, the resultant product has nylon-fiber density concentrated on the structural-composite element's side opposite to the element's concentration of HIPS on the other side. As such in an application wherein the structural-composite element is subject to a bending-moment, such as but not limited to, shelving, with the HIPS surface up and the nylon-fiber concentrated surface down, the tensile strength of the nylon-fiber will allow for a thinner panel than otherwise.

Further, it has been observed that due to the migration of the plastic flowing into and throughout the nylon-fiber, due in part to the pressure aspects of the thermoforming process, said nylon-fiber(s) are straightened and stretched out. Said tensioning of said nylon-fiber(s) becomes 'locked' if the plastic is allowed to fully solidify before said pressure is released. The said pre-tension-ing of the nylon-fiber and the resultant pre-compressing of the plastic allows for higher than otherwise tensile loads on the plastic items of the present invention's structural-composite.

Specific to that configuration referenced above in this alternative preferred embodiment, utilizing the process of pre-heating the nylon-fiber providing a thermal-mass lower than the nylon-fiber's melt-point but higher than the ABS melt-point, in conjunction with or alternatively as a separate function, the HIPS material may be pre-chilled so as to delay the on-set of the HIPS thermal-gain and it reaching its melt-point.

It being noted that other materials and other materials' geometry apply to the above. For example, the referenced nylon-fiber may be substituted with fiberglass and or carbon-fiber and or like materials. Such substitutions, in addition to the originally mentioned nylon, may be used in different geometrical configurations, such as but not limited to screens, grating, or other micro-structural shapes.

Yet another alternative preferred embodiment utilizes the differential between certain materials' melt-point(s) and the requirement of well designed structural-composites for shear transfer between opposing extreme fibers such that, if tensile-tear is optimal, shear strength, for a given composite is greater than compressive strength which in turn is greater than the composite's tensile strength. It being a given that most recycled plastic composites structurally fail catastrophically in compression and most strata or laminates catastrophically fail in either compression or shear or both.

This alternative preferred embodiment utilizes melt-point differentials. Specific examples for the referenced embodiment may include polyethylene terephthalate (PET), Nylon-fiber & acrylonitrile butadiene styrene (ABS). Under atmospheric pressure, PET melts at +/−480 degrees F., while Nylon-fiber melts at +/−500 degrees F. and ABS melts at +/−220 degrees F. It should be kept in mind that thermo-forming pressures, usually, significantly, reduce melt-points and the use of recycled materials usually have some 'contaminates' which will move individual melt-points.

To achieve the desired structural-composite characteristics of a failure-mode based on tensile-tear, rather than catastrophic compressive or shear failure, a determination is made to the quantity of nylon-fiber at the extreme-fiber and the distance to the neutral axis, in the case of bending moment. The distance from the extreme-fiber to the neutral axis determines the thickness of the composite's core material which in this example consists of the high melt-point recycled PET. To provide the significant shear transfer, between extreme-fibers, required the referenced PET material is presented to the thermoforming process with passages which will allow migration, during the thermoforming process, of the nylon-fibers which will sandwich the PET materials. Said migration of the nylon-fibers will be encouraged by the melt of ABS material which will sandwich the nylon-fibers and the PET core materials.

Ingress of the nylon-fibers, through the referenced PET material core's passages, put said migrated nylon-fibers in shear with the application of a bending-moment on this embodiment of the present invention. It can be seen that to achieve this embodiment the operating temperature and pressure of the thermoform process need only be such as to melt and cause flow of the lower melt-point ABS material.

There are seven different identified types of plastic usually involved in recycling activities plus a number of other types of plastics and materials frequently encountered in co-mingled waste-streams. Some of these, but not limited to, materials addressed in the present invention are: (1) Polyethylene Terephthalate (PET)—typical melt-point range+/−490 F to 510 F (255 C to 265 C) PET density is greater than water. Recycled PET is frequently used in such items such as textiles, carpets, fiber fillings for apparel, audio cassettes, soft drink bottles, water bottles, plastic jars, and some plastic wrappings, (2) High-Density Polyethylene (HDPE)—typical melt-point range+1-250 F to 275 F (120 C to 137 C). HDPE is frequently used in plastic milk cartons, juice and liquid detergent containers. Recycled HDPE is used in such items as plastic pipes, agricultural and plant containers, trash cans and buckets, (3) Vinyl/Polyvinyl Chloride (PVC)—typical melt-point range+1-212 F to 500 F (100 C to 260 C). PVC is frequently used in piping, liquid detergent containers, food wrappings and blister packaging. (4) Low-Density Polyethylene (LDPE)—typical melt-point range+/−257 F to 278 F (125 C to 137 C). LDPE is frequently used in plastic bags and garment bags. Recycled LDPE is frequently used in plastic trash bags, plastic tubing and plastic lumber. (5) Polypropylene (PP)—typical melt-point range+/−320 F to 330 F (160 C to 165 C). PP is frequently used in the automotive industry, also for bottle tops, battery casings and carpets. (6) Polystyrene (PS)—typical melt-point range+/−365 F to 500 F (180 C to 260 C). PS is frequently used in meat packing, protective packing and packing foam. (7) OTHER: Usually layered or mixed plastic. Common examples are headlight lenses and safety glasses; No recycling potential—must be landfilled. (8) polyvinyl alcohol (PVA)—typical melt-point range+/−356 F to 374 F (180 C to 190 C). (9) Acrylonitrile butadiene styrene (ABS)—typical melt-point range+/−218 F to 260 F (103 C to 128 C). (10) High impact polystyrene (HIPS)—typical melt-point range+/−392 F to 500 F (200 C to 260 C). (11) polylactide (PLA)—typical melt-point range+/−302 F to 320 F (150 C to 160 C). (12) Nylon—typical melt-point range+1-428 F to 510 F (220 C to 265 C). (13) Polycarbonate (PC)—typical melt-point range+/−510 F (+/−265 C). (14) Acrylic—typical melt-point range+/−572 F to 600 F (+/−300 to 315 C). (15) Fiberglass—typical melt-point range+/−2075 F (+/−1121 C).

Another, special case, is shape memory plastics (SMP). SMPs are plastics which if deformed using heat and external force, and then are allowed to cool-harden, when they are heated again they return to their original shape. This is a typical characteristic in plastics having a cross-linked structure. SMPs do not usually melt so recycling them is difficult.

Those knowledgeable in the present art of recycling plastics with or without 'contaminates' will understand that equipment, facilities and operations usually required to complete the recycling process includes many and varied configurations. To name but a few: air classifiers, mechanical classifiers, sink-float tanks, hydrocyclones, froth flotation, dissolution, hydrolysis, pyrolysis, laser spectral analysis, and electrostatic separation.

The present invention avoids most of the expenses associated with the above referenced. What is required is a typically encountered operation known as mechanical grinding. Recycled plastics are fed into mechanical grinders where they're ground into flakes. Most post-consumer plastics, in addition to being of, as referenced above, a mixed plastic nature, collected for recycling have traditionally nonrecyclable materials attached such as paper, metal parts or glass. The product of such an operation is known in the industry as "dirty" regrind. Traditionally, this material would have to be "cleaned" in order to be recycled.

The above referenced 'cleaning' operation usually first uses air to remove materials lighter than plastic, such as paper labels. The grit is then passed through scrubbers to materials such as oils, glue residues and inorganic dust. The plastic grit is then run through a "float/sink" tank(s) where heavier plastics heavier than water sink and lighter plastics float.

The recovered plastic is usually re-melted and converted into pellet form before being used in traditional injection-molding, blow-molding or extrusion-molding.

FIG. 1 illustrates the process of forming an embodiment of a thermoformed composite. Upper plate 1 and lower plate 2 hold a matched die set having a male segment 3 and a female segment 4. Addressing FIG. 1, from left to right, the left-most plates 1 and 2 hold the matched die set 3 and 4. A thermoform-able material 5, which in the present art is frequently pre-heated, is placed between die set 3 and 4. Through heat and pressure, thermoform-able material 5 is converted into the desired end-shape.

The desired shape may be flat, V-shaped, rounded, or any other bent or molded shape. Different die sets are used to achieve the different desired shapes. The thermoform-able material 5 is removed from the die set once it has completely cooled. It should be noted that the term "thermoform-able" is used here as reference to specific material(s) melt-point for a given thermal-mass plus pressure.

Figure 2:
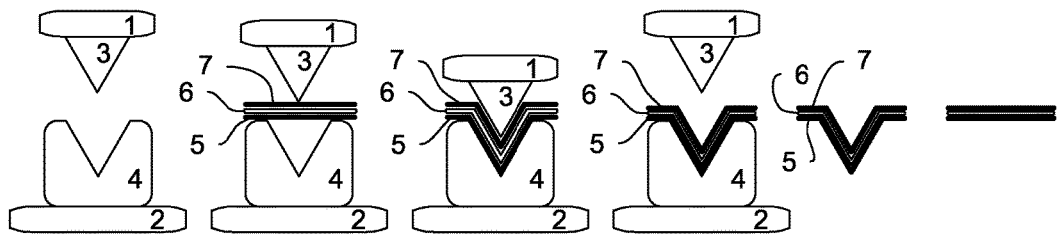
FIG. 2 illustrates the process of forming an embodiment of a thermoformed composite.

FIG. 2 illustrates the process of forming an embodiment of a thermoformed composite. The process of FIG. 2 is similar to the process of FIG. 1. Plates 1 and 2 hold the matched die set 3 and 4. Unlike FIG. 1, that demonstrates a single thermoform-able material 5, FIG. 2 shows three distinct materials 5, 6 and 7. Through the thermoforming process of heat and pressure, materials 5, 6 and 7 are structurally laminated into a finished desired product.

This thermoforming process is sometimes known as the 'strata-process'. As the term 'strata-process' implies the 'laminated' together materials retain their individual structural integrities. That is, for example as shown in FIG. 2, the thermoforming process of materials 5, 6 and 7 provides the intended results of two distinct shear-planes. Said two distinct shear-planes being that structural interface between materials 5 and 6 and materials 6 and 7.

Figure 3:
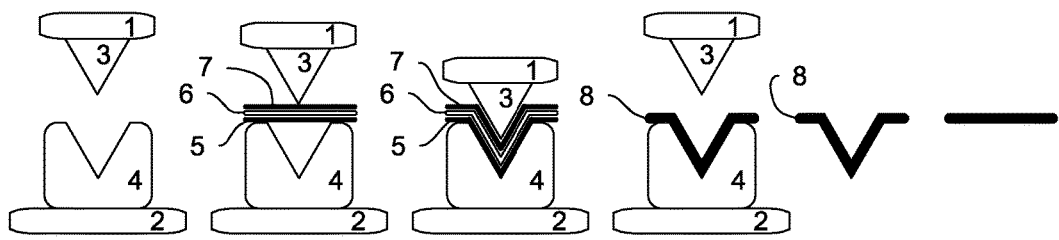
FIG. 3 illustrates the process of forming an embodiment of a thermoformed composite.

FIG. 3 illustrates the process of forming an embodiment of a thermoformed composite. The process of FIG. 3 is similar to the process of FIG. 1. Addressing FIG. 3, from left to right, the left-most plates 1 and 2 hold the matched die set 3 and 4. Similar to FIG. 2, FIG. 3 shows three distinct materials 5, 6, and 7 which through the thermoforming process of heat and pressure are structurally melded into a single finished desired structural composite 8. Composite 8 is a product without defined distinct shear-planes.

An example of this process is the pre-thermoforming sandwiching of a fiber material such as nylon fiber and or fiberglass strand and or carbon-fiber material 6 having a melt-point higher than the material(s) 5 and 7. The invention's thermoforming operation elevates the thermal-mass of material(s) 5 and 7 to or above the melt-point of material(s) 5 and 7 but does not approach the melt-point of the fiber material 6. Through the invention's thermoforming process, materials 5, 6 and 7 merge together to form a single structural entity 8 without distinct shear-planes.

Figure 4:
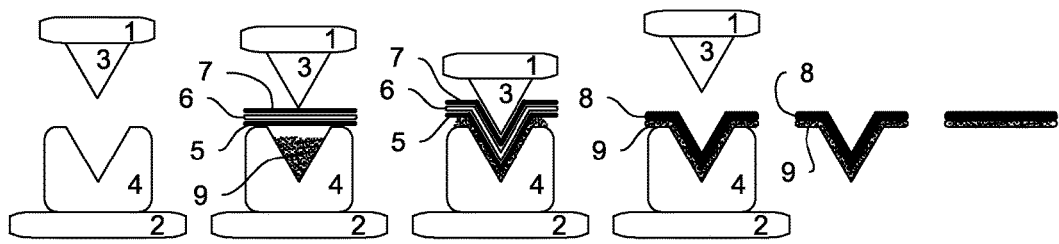
FIG. 4 illustrates the process of forming an embodiment of a thermoformed composite.

FIG. 4 illustrates the process of forming an embodiment of a thermoformed composite. The process of FIG. 4 is similar to the process of FIG. 1. FIG. 4 is similar to FIG. 3 but with the addition of material 9. Plates 1 and 2 hold the matched die set 3 and 4. As in FIG. 3, FIG. 4 shows three distinct materials 5, 6 and 7 which through the thermoforming process of heat and pressure are structurally melded into a single finished desired structural composite 8. Composite 8 is a product without defined distinct shear-planes.

FIG. 4 also shows referenced material 9. The present invention allows the use of material which has not been pre-formed into sheets and or plates. The present invention allows the formation of a combination of a single structural composite 8 with a strata material 9 having a distinct shear-plane.

Figure 5:
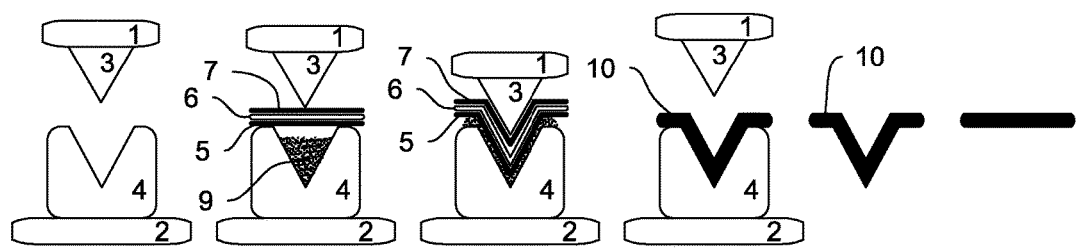
FIG. 5 illustrates the process of forming an embodiment of a thermoformed composite.

FIG. 5 illustrates the process of forming an embodiment of a thermoformed composite. The process of FIG. 5 is similar to the process of FIG. 1. FIG. 5 is similar to FIG. 4 except that material 9 is of a different nature. Materials 5, 6, and 7 and material 9 are thermoformed such that the present invention's thermoforming operations melds with materials 5 6 and 7 and material 9 to form a single structural entity 10 without distinct shear-planes.

Figure 6:
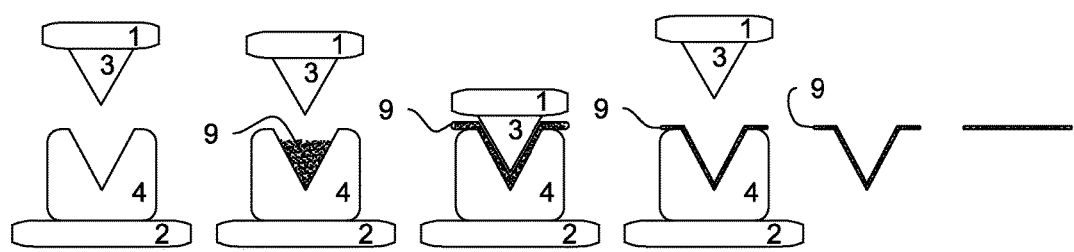
FIG. 6 illustrates the process of forming an embodiment of a thermoformed composite.

FIG. 6 illustrates the process of forming an embodiment of a thermoformed composite. The process of FIG. 6 is similar to the process of FIG. 1. FIG. 6 is similar to FIG. 5 but without any pre-formed sheet materials 5, 6 and 7 as depicted in other previous FIGURES. Material 9 is thermoform-able material(s) or thermoform-able materials(s) and non-thermoform-able material(s) mixture. The present invention's direct reduction of material 9 to a single structural entity without distinct shear-planes, reduces direct materials costs.

Examples include thermoform-able recycled post-consumer electronic-waste ABS plastic grind and or recycled nylon fiber, recycled polypropene and/or the like. Mixtures of thermoform-able and non-thermoform-able grind may include non-thermoform-able materials such as titanium dioxide, ceramic dust, metal filings, marble dust, shale flake and/or the like. It should be noted that the terms "thermoform-able" and "non-thermoform-able" are used here as reference to a specific material's melt-point for a given thermal-mass plus pressure. As such, for example, a mixture of ABS grind with nylon fibers and a thermoform operating effective temperature higher than the melt-point for a chosen ABS but lower than the melt-point for a chosen nylon would by definition have the nylon to be considered "non-thermoform-able" material(s) for the example's mixture.

Figure 7:
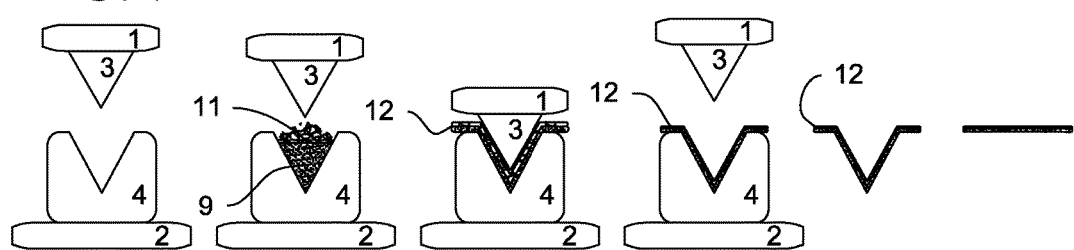
FIG. 7 illustrates the process of forming an embodiment of a thermoformed composite.

FIG. 7 illustrates the process of forming an embodiment of a thermoformed composite. The process of FIG. 7 is similar to the process of FIG. 1. FIG. 7 is similar to FIG. 6 but with structural/micro-structural elements 11 included with the afore-referenced recycled grind material(s) 9. Said structural elements 11 may include recycled fiberglass air filter structures, recycled spent industrial filter structures, recycled plastic extrusion, metallic and metallic/plastic screens, and or scraps of such and similar screening and such for the purpose of forming a single structural entity without distinct shear-planes.

Figure 8:
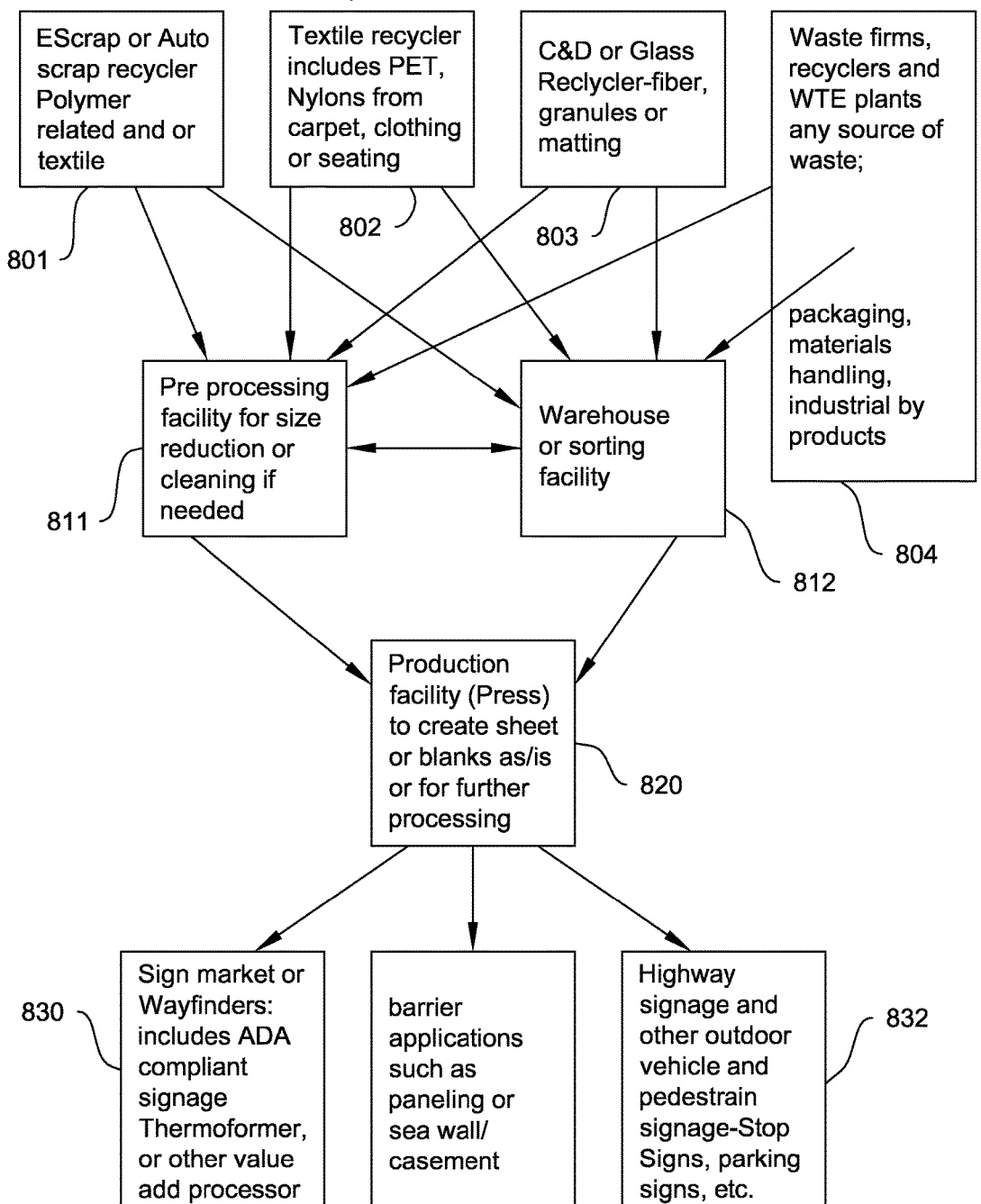
FIG. 8 is a flowchart illustrating the production process.

Now referring to FIG. 8, a flowchart illustrates the production process. Various sources are gathered into a pre-processing facility 811 or a warehouse or sorting facility 812. Pre-processing facility 811 may be used for size reduction or cleaning if needed. Some of the various material sources may be: (801) EScrap or Auto scrap recycler Polymer related and or textile; (802) Textile recycler that includes PET, Nylons from carpet, clothing or seating; (803) C&D or Glass Recycler-fiber, granules or matting; (804) Waste firms, recyclers and WTE plants, any source of waste, packaging, materials handling, or industrial by-products.

The material is retrieved from the pre-processing facility 811 or warehouse facility 812 and brought to a production facility 820. The production facility 820 uses presses to create sheets or blanks. Further processing such as thermo-forming, cutting, painting, silk screening or laser etching may also be performed.

After production, the new sheets or blanks are sent out of the production facility 820 to be used for various products. Some of these products consist: (830) Sign market or Wayfinders, which includes ADA compliant signage, Thermo former, or other value add processors; (831) barrier applications such as paneling or sea wall/casement; (832) highway signage and other outdoor vehicle and pedestrian signage (e.g. stop signs, parking signs, etc.).

Many sources may be used for the material. Primary sourcing are certified EScrap recovery facilities such as MBA Polymers, GEEP, MEXTEK, CEAR, SIMS and others. By sourcing polymers generated from these EScrap recovery locations, a new end usage is being created for this problematic scrap. In addition, other non polymer material, especially glass from CRT monitors, are hoped to be included as part of the composite recipe, once deemed safe. If safety cannot be assured, the other glass sourcing mentioned, will suffice.

These recovery processes are mandated and policy driven under producer responsibility policies or as part of landfill diversion requirements around the world. The shortage of many materials in the EScrap stream drive the overall recovery efforts. In so doing, the larger volume materials are ignored. This is comparable to the illegal poaching of rare species such as Rhinos in order to get the horn, but leave the carcass of the rest of the animal to waste. We help provide and support the legitimate recovery of materials domestically and around the globe.

Similar materials are also able to be recovered from auto scrap, packaging and consumer goods. Other material sourcing as part of the composite recipe include glass fibers recovered from building insulation or made from recovered glass from packaging, old insulation, CRT glass, or other post consumer glass fiber sourcing.

Such programs are often part of a closed loop process by the OEM'S of the glass products or from waste firms as part of their waste contracts. Examples would be Owens Corning, Waste Management, Johns Manville, and CertainTeed who need recovery of these materials to meet internal corporate pledges (CSR) or as part of a requirement in order to sell new materials. The composite disclosed herein is a value added alternative to landfill and improper disposal.

The other component materials are recovered from post consumer textile waste; specifically flooring waste and or carpet. The key materials recovered from this sourcing channel are nylon (polyamide) waste, PP (polypropylene) waste or PET waste. The fibrous components of these materials lend themselves to helping create a matrix type structure during the melting and forming of the composites.

In addition, these materials can also be pre melted to form a base material or pelletlflake/chip, that can be used in the composite structure as well. Other flooring components such as PVC will play a role in composites where the end market will allow PVC content or prefers it. PVC has an inherently flame retardant quality that lends itself to certain applications other materials do not provide. Since, it is also available as a post consumer material in large supply, we see it as an interchangeable option as needed.

In referring to the EScrap supply earlier, we also have incorporated PVC wire strippings from EScrap recovery facilities or auto scrap/metal scrap plants. This is another highly problematic scrap where our composite helps to provide an effective alternative solution to landfill, burning or illegal disposal.

These post consumer waste materials are all then shipped to a central location in various forms: bales of fiber, chips or pellets primarily. They can also be entire parts that we can process ourselves if need be. After these materials arrive at the centralized location, various blending methods. This can range from hand blending in a bucket to large batch blending in industrial blending equipment to meet volume needs.

The blending of these large distinctive and problematic waste streams have not been done before and offer a unique set of properties and performance that add value and offer a value added non landfill or non incineration option heretofore not previously performed. Further refining and blending is accomplished at the hydraulic press or mechanical press. It is at that point, that layering of the materials and or the dispersion of materials in a mold of various shapes can be performed. These layers allow for the melt differentials or similarities to complement each other in a unique and performance enhancing fashion.

A similar example might be the way concrete is laid down using rebar and or fiber additives. Certain systems for charting carbon fiber composites use a sheet process built layer upon layer under heat. The composite disclosed herein uses unique combinations of waste materials that each contribute to adding strength, flame retardancy, impact or temperature tolerance improvement and improved weatherability in order to create a finished sheet products to be used in various end applications as is, or to be submitted for further processing such as thermoforming, cutting, painting, silk screening or laser etching.

Figure 9:
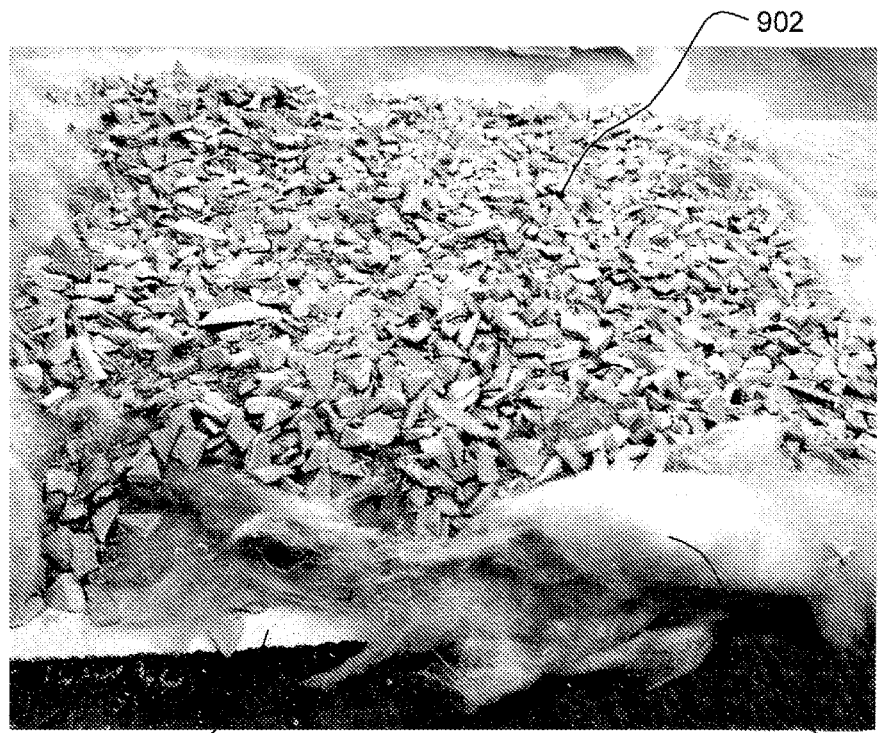
FIG. 9 illustrates an embodiment of various materials combined prior to production.

FIG. 9 illustrates various materials combined prior to production. Layered above a material sheet 900, are a fiberglass layer 901 and foam or wood layer 902. Other materials may also be used in place of the layers. Sheets of different materials may also be used as long as they provide a solid outer layer that helps the layered materials retain a sturdy shape while pressed during production.

Figure 10:
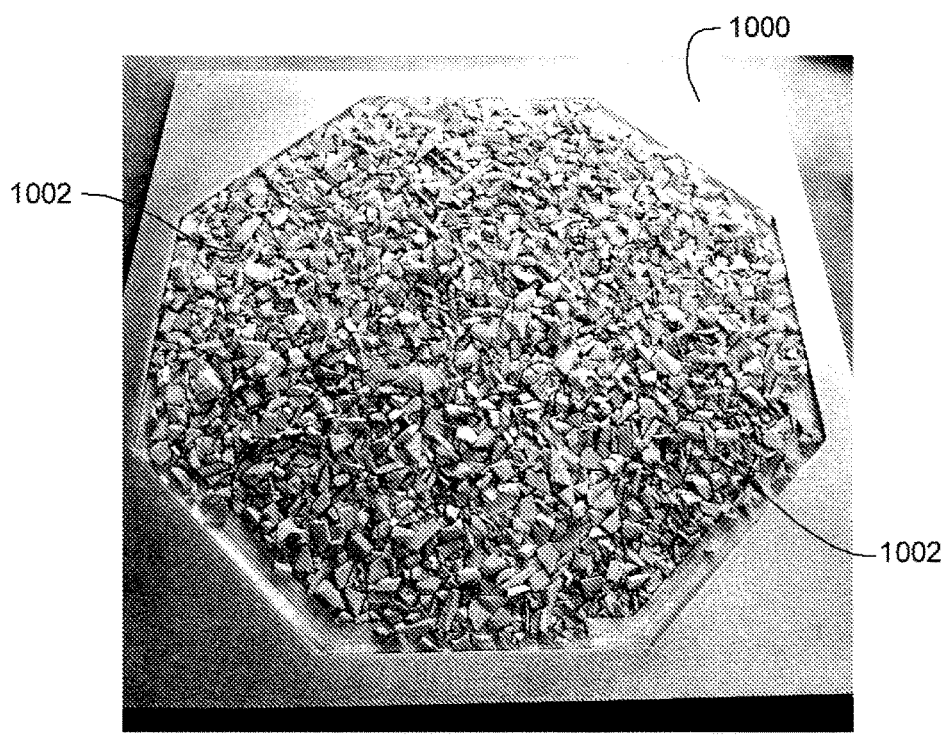
FIG. 10 illustrates an embodiment of various materials combined prior to production.

FIG. 10 illustrates various materials combined prior to production. Layered above a material sheet 1000, are a fiberglass layer 1001 and foam or wood layer 1002. The layered materials 1001 and 1002 may be arranged in a pre-determined shape. The shape depicted in FIG. 10 is an octagon shape (e.g. stop sign). Other materials may also be used in place of the layers. Sheets of different materials may also be used as long as they provide a solid outer layer that helps the layered materials retain a sturdy shape while pressed during production.

Figure 11:
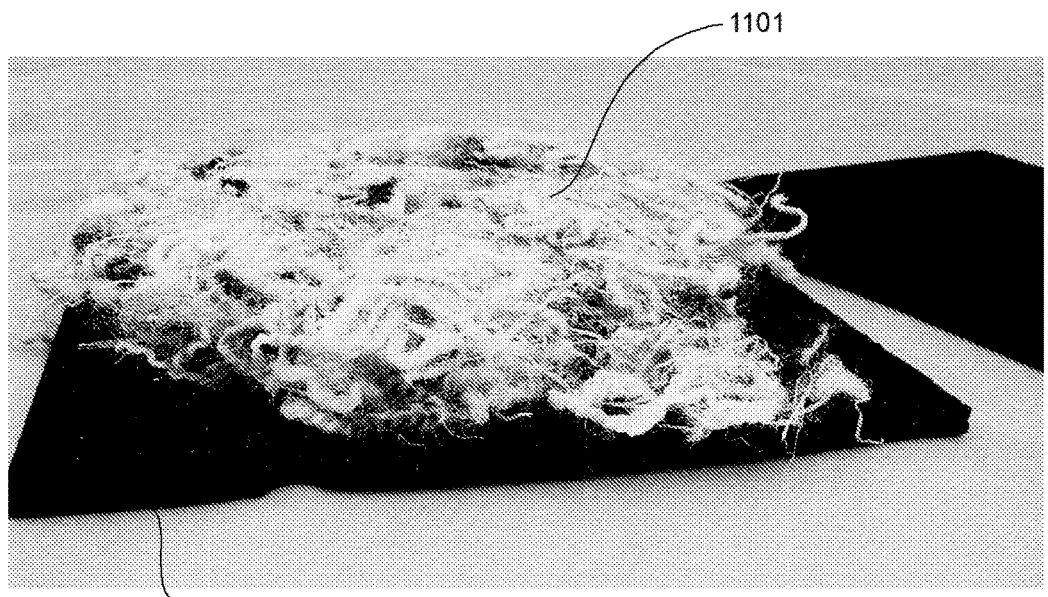
FIG. 11 illustrates an embodiment of various materials combined prior to production.

FIG. 11 illustrates various materials combined prior to production. Layered above a material sheet 1100, are various forms of string, yarn and thread 1101. Other materials may also be used in place of the layers. Sheets of different materials may also be used as long as they provide a solid outer layer that helps the layered materials retain a sturdy shape while pressed during production.

Figure 12:
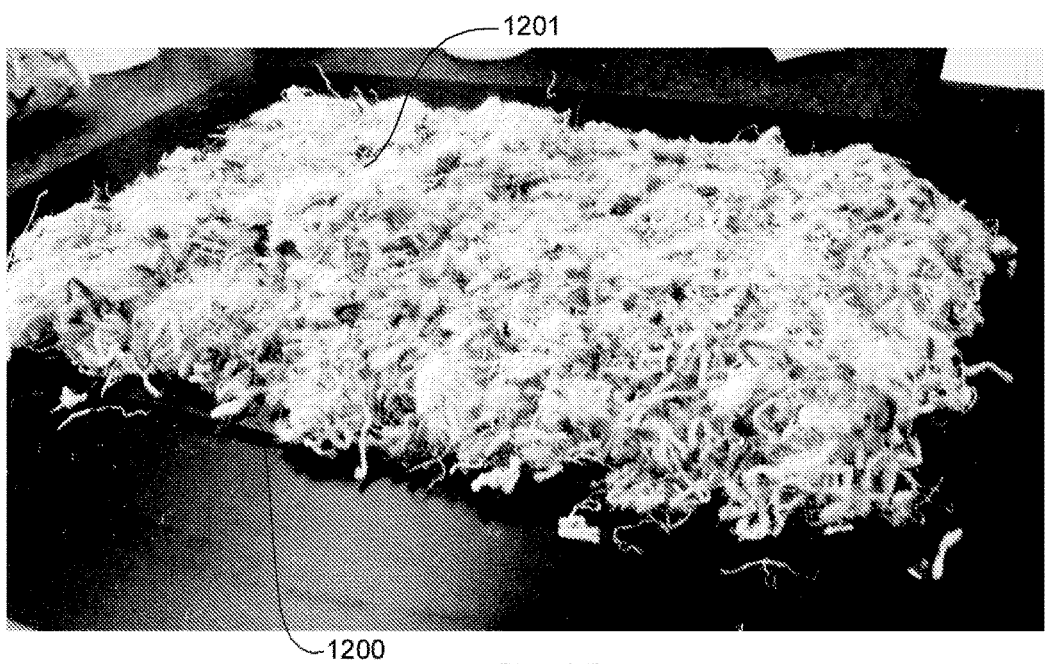
FIG. 12 illustrates an embodiment of various materials combined prior to production.

FIG. 12 illustrates various materials combined prior to production. Layered above a material sheet 1200, are various forms of string, yarn and thread 1201. Other materials may also be used in place of the layers. Sheets of different materials may also be used as long as they provide a solid outer layer that helps the layered materials retain a sturdy shape while pressed during production.

Figure 13:
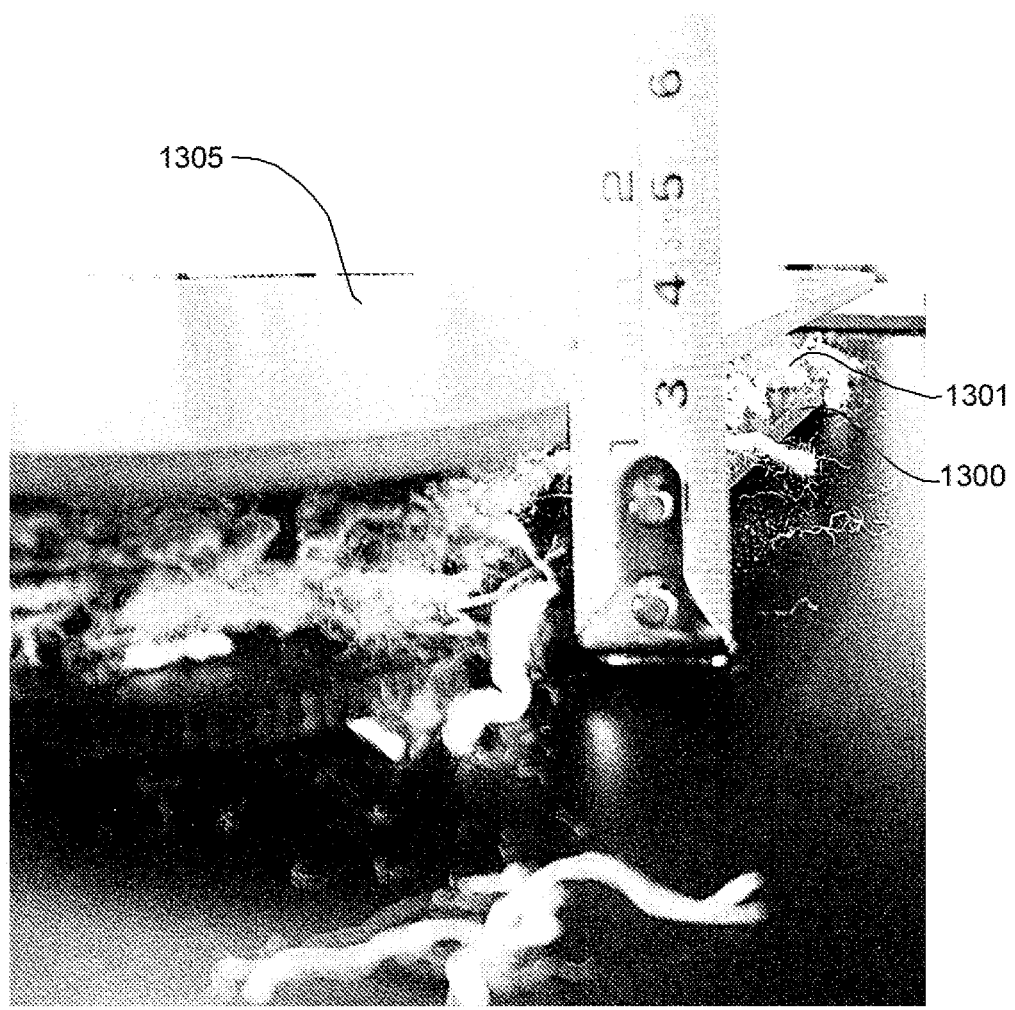
FIG. 13 illustrates an embodiment of various materials combined prior to production.

FIG. 13 illustrates various materials combined prior to production. Layered above a material sheet 1300, are various forms of string, yarn and thread 1301. Another material sheet 1305 is placed on top the string/yarn/thread layer 1301. Material sheets 1300 and 1305 cooperate to sandwich the string/yarn/thread layer 1301. Other materials may also be used in place of the layers. Sheets of different materials may also be used as long as they provide a solid outer layer that helps the layered materials retain a sturdy shape while pressed during production.

Figure 14:
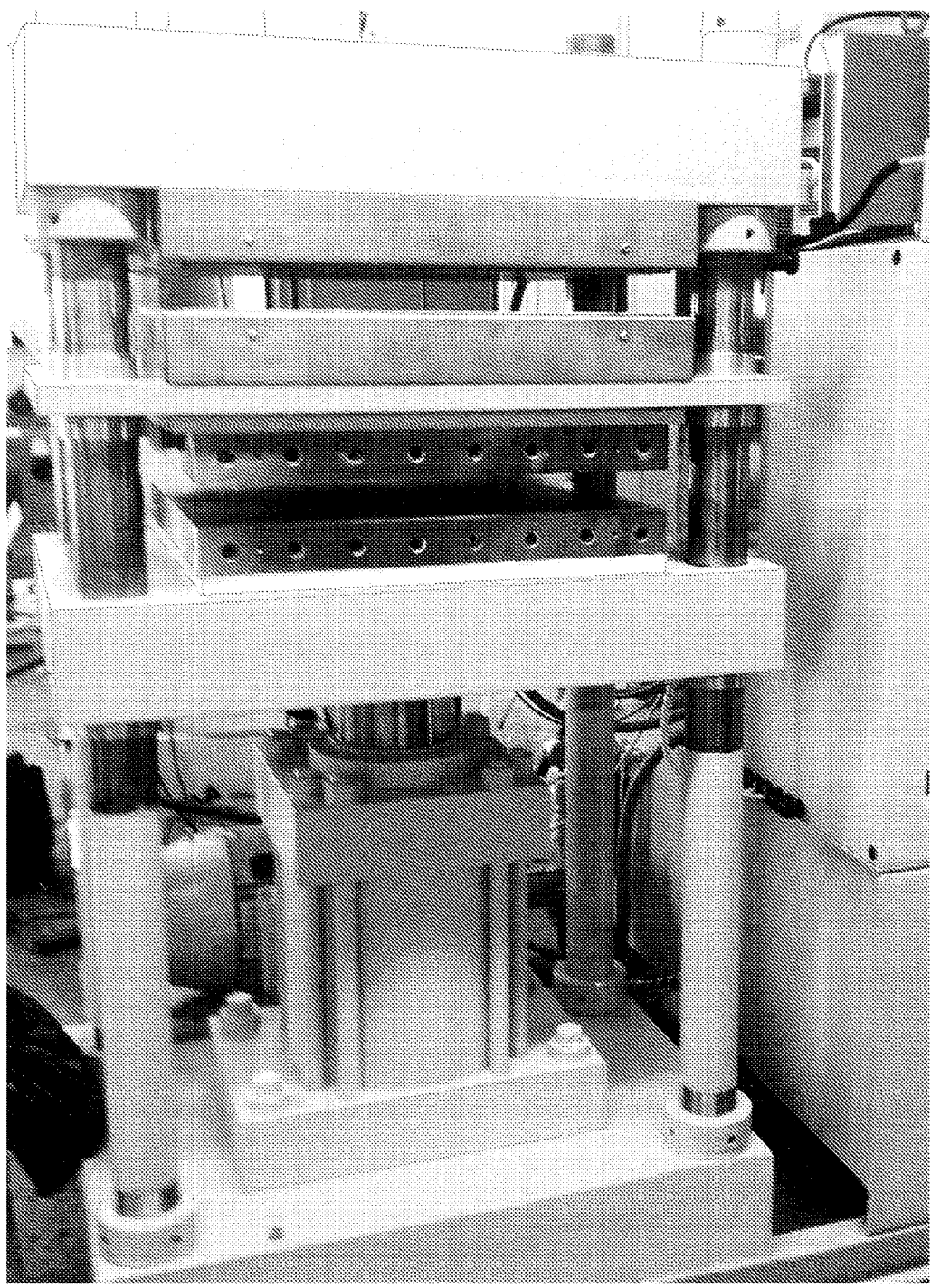
FIG. 14 illustrates a press used to create a sheet of thermoformed composite.
Figure 15:
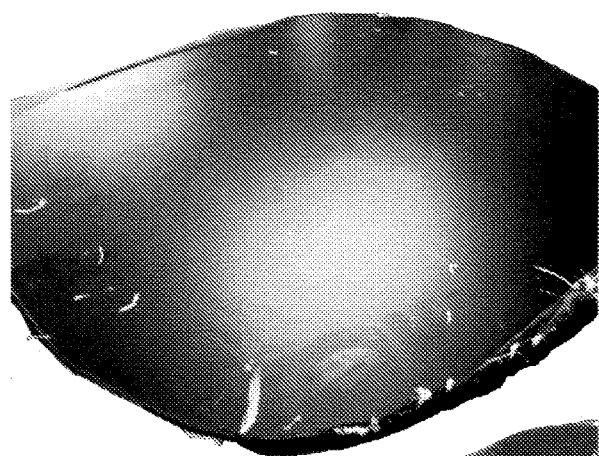
FIG. 15 illustrates a thermoformed composite after production.

FIG. 14 illustrates an exemplary press used to produce the finished composite sheet. The press is known in the art and provides equally dispersed pressure along the top and bottom of the sheet. This equally dispersed pressure ensures the sheet has equal thickness throughout its planar axis. Preferably, the press uses a hydraulic pressure to compress the layers. If thermoforming, an intense heat is also used to thermally "melt" the layers together and create a single bonded layer FIG. 15 illustrates a thermoformed composite after production. The composite comprises material sheet layers and a string/yarn/thread layer. The layers have been compressed together and heated to create a single composite sheet. The new composite sheet comprises the strengths of the individual layers from the pre-production. The new composite sheet may be further shaped and formed into a pre-determined shape to be used for signage, paneling, etc. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 16:
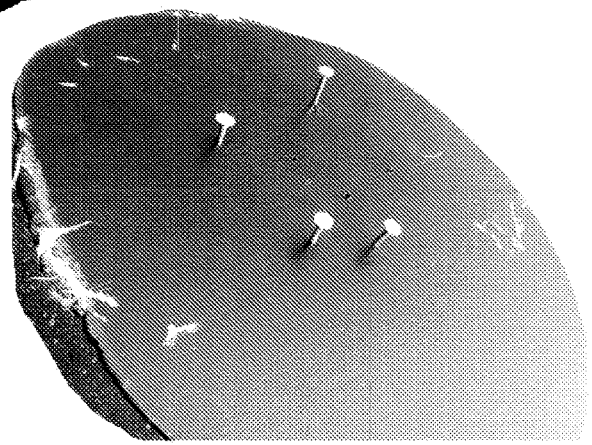
FIG. 16 illustrates a thermoformed composite after production.

FIG. 16 illustrates a thermoformed composite after production. The composite comprises material sheet layers and a string/yarn/thread layer. The layers have been compressed together and heated to create a single composite sheet. The new composite sheet comprises the strengths of the individual layers from the pre-production. The new composite sheet may be further shaped and formed into a pre-determined shape to be used for signage, paneling, etc. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 17:
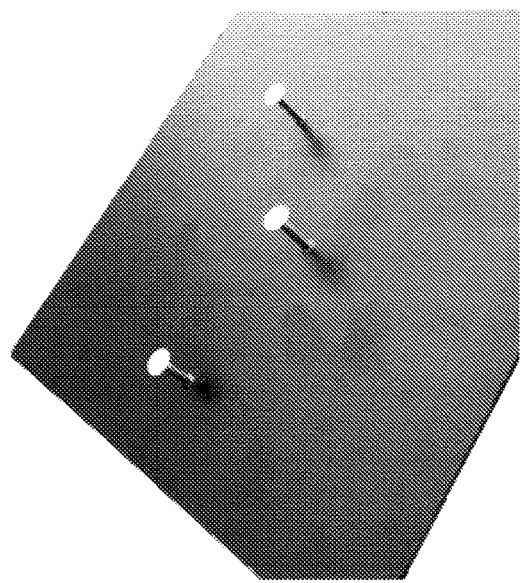
FIG. 17 illustrates a thermoformed composite after production shaped into a square.

FIG. 17 illustrates a thermoformed composite after production. The composite comprises material sheet layers and another material layer. The layers have been compressed together and heated to create a single composite sheet. The new composite sheet comprises the strengths of the individual layers from the pre-production. The new composite sheet may be further shaped and formed into a pre-determined shape to be used for signage, paneling, etc.

In FIG. 17, the composite sheet has been cut and shaped into a square. Other shapes are also allowable. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 18:
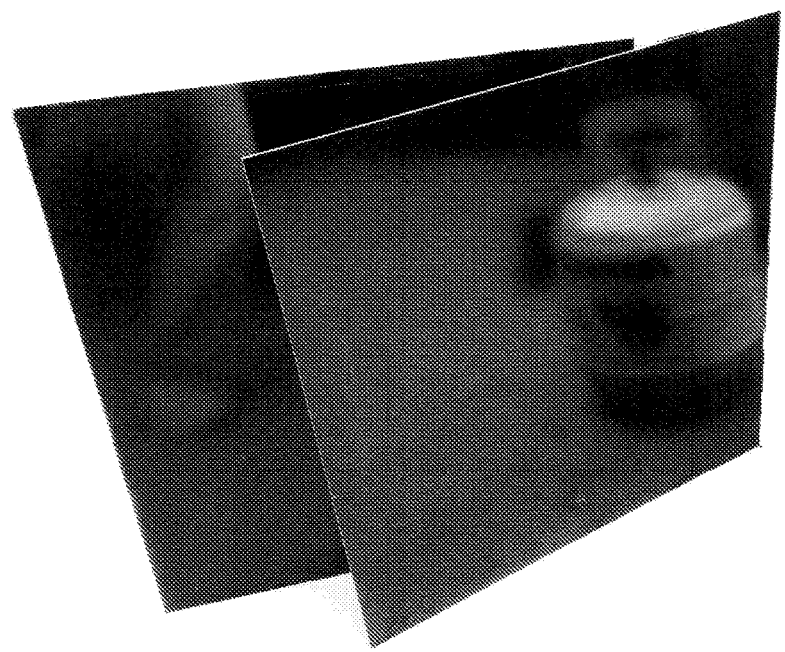
FIG. 18 illustrates a perspective view of a thermoformed composite after production shaped into a square.

FIG. 18 illustrates a perspective view of a thermoformed composite after production. The composite comprises material sheet layers and another material layer. The layers have been compressed together and heated to create a single composite sheet. The new composite sheet comprises the strengths of the individual layers from the pre-production. The new composite sheet may be further shaped and formed into a pre-determined shape to be used for signage, paneling, etc.

In FIG. 18, the composite sheet has been cut and shaped into a square. Other shapes are also allowable. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 19:
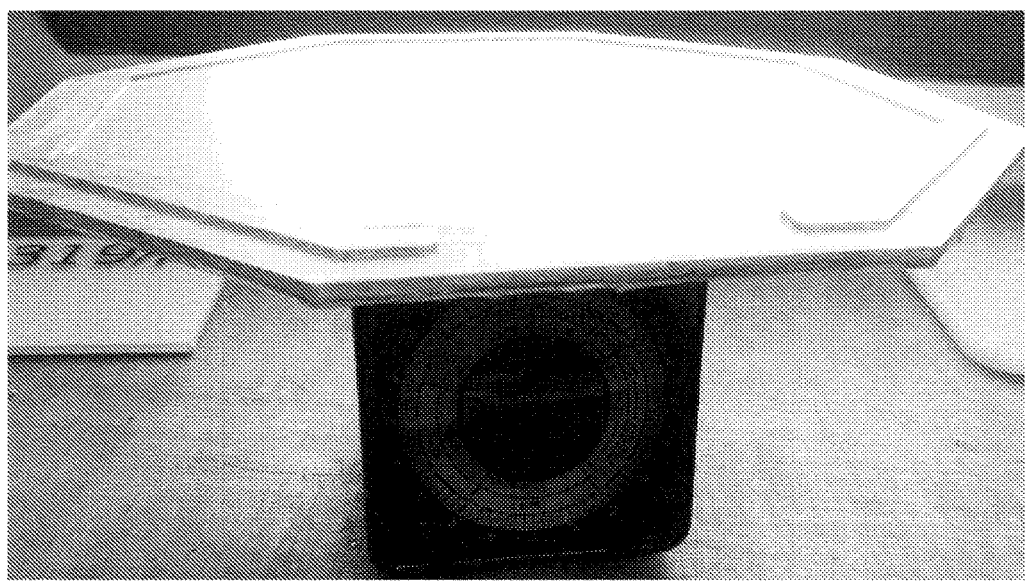
FIG. 19 illustrates a thermoformed composite after production shaped into an octagon.

FIG. 19 illustrates a thermoformed composite after production. The composite sheet has been shaped into an octagon form. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 20:
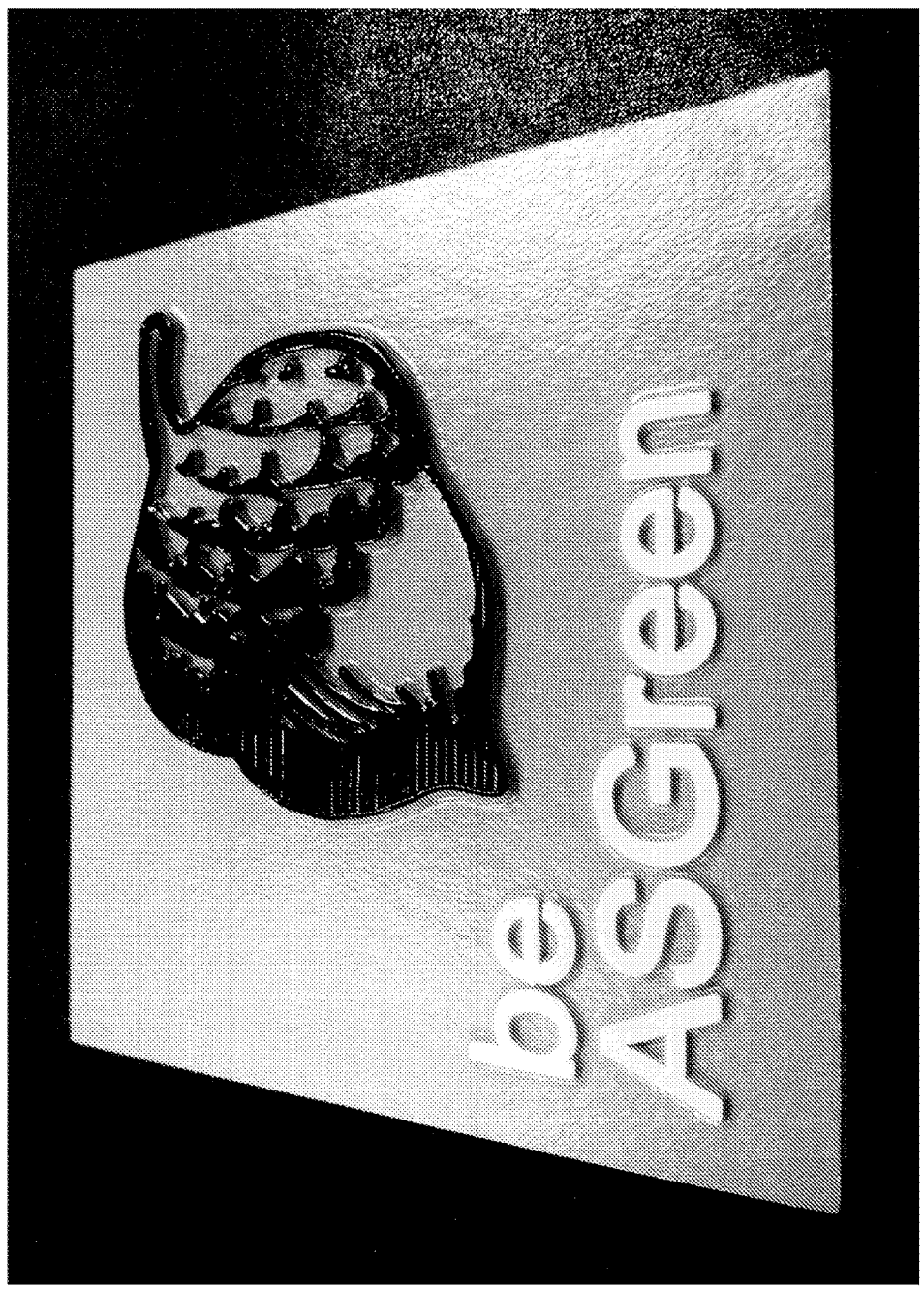
FIG. 20 illustrates a thermoformed composite after production shaped into a square sign.

FIG. 20 illustrates a thermoformed composite after production. The composite sheet has been shaped into a square sign. The sign includes graphics and lettering that is formed during the thermoforming process. This is done by having the graphic and/or lettering as part of a negative imprint of the press dies. This allows the layered materials to not be fully compressed in the negative imprint areas while completely compressed in the non-negative imprint areas.

Negative imprints in the dies are common to the art of molding and casting. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

The invention uses a unique combination of materials recovered from various waste streams or recycling processes to create various recipes and formulas to serve a variety of end markets. The combinations from these unrelated sources and material types are combined and formed, using thermoforming and hydraulic pressure to create composites not currently available. They also divert materials from landfills or illegal disposal in to a value added series of products such as signage, sheet and board type products for the disability community, military or government sector and transportation markets.

The inherent, yet unique qualities, such as impact properties, flame retardancy, rigidity, cold crack resistance and melt variances each contribute to end properties that allow for uses that are not achievable if each material were to be used on its own. Energy, emissions and water savings from the use of such materials have also been documented in various life cycle studies by the EPA and NGO's. Thereby making these materials and/or end products suitable for numerous environmental credits; LEED, Carbon offsets and diversionary credits.

As in the claims above to include the use of a 'foaming' material 'mixed' with the above referred thermoform-able 'grind' allows the deterministic nature of a 'foaming' material to provide and or enhance the 'pressure' aspect of commonly encountered thermoform operations. Such 'foaming' material(s) may be 'triggered' to 'foam' before, during, or after the thermoforming of the desired structural-composite. In the use of foaming materials, the activation of the foaming action can be designed to occur before, during, and or after thermoforming the intended structural composite. Activation of the foaming action after the construction of the structural composite allows intended results such as internal pressurizing of said structural composite.

It will be apparent to those skilled in the art, that is, to those who have knowledge or experience in this area of technology that many uses and design variations are possible for the invention disclosed herein. The above detailed discussion of various alternative and preferred features and embodiments will illustrate the general principles of the invention. Other embodiments suitable for other applications will be apparent to those skilled in the art given the benefit of this disclosure. The particular combination of parts described and illustrated herein is intended to represent only certain embodiments of the present invention.

The invention claimed is:

1. A thermoformed structural-composite construct comprising:
    a first material having a first melting point, a first thermal mass, a first thermal energy density, a first thermal-energy gradient, and a first structural integrity;
    a second material having a second melting point, a second thermal mass, a second thermal energy density, a second thermal-energy gradient, and a second structural integrity,
    wherein said first and second materials are compressed between a first matched die and a second matched die to create heat and pressure by utilizing the differential between the first and second melting points, first and second thermal masses, first and second thermal energy densities, the first and second thermal-energy gradients, and the first and second structural integrities in the individual near-melt-point range vis-a-vis pressure-heat ratio for only the first material but does not approach the second melting point for the second material; and
    a third composite material thermoformed from merged compression of said first material with said second material,
    wherein the third composite material is thermo-formed without distinct shear planes,
    wherein said first material includes one from the following: Polystyrene (PS), Acrylonitrile butadiene styrene (ABS), and High impact polystyrene (HIPS), and
    wherein said second material includes one of the following: phase-separated mixtures, immiscible blends, Polyethylene Terephthalate (PET), or poly(vinyl alcohol) (PVA).

2. The thermoformed structural-composite construct of claim 1, wherein the first and second materials originate from waste streams of various origins, cellulose acetate materials from cigarette filters, or packaging fillings.

3. The thermoformed structural-composite construct of claim 1, wherein the first and second materials further include co-mingled material.

4. The thermoformed structural-composite construct of claim 1, wherein the second material further includes one of the following: thermoset epoxies, thermoset polyesters, thermoset silicones, thermoset phenolics, vulcanized rubber, polyoxybenzylmethylenglycolanhydride (bakelite), cross-linked polyethylene (PEX), Polyurethane (PU), carbon fiber, flame retardant plastics, fiber reinforced plastics.

5. The thermoformed structural-composite construct of claim 1, wherein the second material further includes one of the following: glass filled plastics, cured silicone, mixed plastics, metals, paper, or shape memory plastics (SMP).

6. The thermoformed structural-composite construct of claim 1, wherein the first and second materials further includes one or more of the following: pigments, inks, adhesives, chlorine, and Olefin.

7. The thermoformed structural-composite construct of claim 1, wherein the first and second materials originating from electronic waste, electrical waste, and automotive waste.

8. The thermoformed structural-composite construct of claim 1, wherein the first and second materials directly reduced from a grind-state to one or more of the following states: film-state, sheet-state, plate-state, laminate film-state, laminate sheet-state, laminate plate-state.

9. The thermoformed structural-composite construct of claim 1, wherein the second material is reinforced with fibers.

* * * * *